US011142387B2

(12) United States Patent
Hall

(10) Patent No.: US 11,142,387 B2
(45) Date of Patent: Oct. 12, 2021

(54) ALERT HANDHELD FOOD STORAGE CONTAINER AND METHOD

(71) Applicant: Keith Hall, Goderich (CA)

(72) Inventor: Keith Hall, Goderich (CA)

(73) Assignee: Keith Hall, Goderich (CA)

( * ) Notice: Subject to any disclaimer, the term of this patent is extended or adjusted under 35 U.S.C. 154(b) by 218 days.

(21) Appl. No.: 16/674,010

(22) Filed: Nov. 5, 2019

(65) Prior Publication Data

US 2021/0130073 A1    May 6, 2021

(51) Int. Cl.
| | |
|---|---|
| *G08B 21/00* | (2006.01) |
| *B65D 81/36* | (2006.01) |
| *B65D 25/02* | (2006.01) |
| *B65D 25/28* | (2006.01) |
| *G08B 7/06* | (2006.01) |
| *G01V 3/10* | (2006.01) |
| *A45C 15/06* | (2006.01) |
| *G08B 21/02* | (2006.01) |

(52) U.S. Cl.
CPC ........... *B65D 81/365* (2013.01); *B65D 25/02* (2013.01); *B65D 25/2867* (2013.01); *G08B 7/06* (2013.01); *A45C 15/06* (2013.01); *B65D 2203/12* (2013.01); *G01V 3/10* (2013.01); *G08B 21/02* (2013.01)

(58) Field of Classification Search
CPC .. B65D 81/365; B65D 25/02; B65D 25/2867; B65D 2203/12; G08B 7/06; G08B 21/02; A45C 15/06; G01V 3/10

USPC ........................................................ 340/540
See application file for complete search history.

(56) References Cited

U.S. PATENT DOCUMENTS

| | | | |
|---|---|---|---|
| 4,359,686 A | 11/1982 | Wherry | |
| 4,413,232 A * | 11/1983 | Most ........................ | G01V 3/15 324/236 |
| 6,667,689 B1 * | 12/2003 | Steffen ...................... | B07C 9/00 209/223.1 |
| 6,833,789 B1 * | 12/2004 | Carmen ................ | B65F 1/1607 324/239 |
| 7,296,683 B1 * | 11/2007 | Vallelonga, Sr. ..... | B65F 1/1607 209/215 |
| 7,525,074 B2 | 4/2009 | Bostick et al. | |
| 7,683,779 B1 | 3/2010 | Pacheco | |
| 9,181,023 B2 | 11/2015 | Clinton | |
| 2018/0368933 A1 * | 12/2018 | Henniges ............... | A61B 50/36 |
| 2019/0141794 A1 * | 5/2019 | Richcreek ............... | F24C 7/083 |

* cited by examiner

*Primary Examiner* — Mark S Rushing
(74) *Attorney, Agent, or Firm* — Rowand LLP

(57) ABSTRACT

A handheld food storage container including a body having a food storage area and an opening for receiving food items into the food storage area. The container may include a handle mounted to the body, a primary alert device housed in the handle, a secondary alert device housed in the body and a metal detector for detecting metal objects located in the food storage area and for causing the actuation of the primary alert device and the secondary alert device.

17 Claims, 4 Drawing Sheets

ALERT HANDHELD FOOD STORAGE CONTAINER AND METHOD

FIELD

The present application generally relates to handheld containers, and in particular, to methods and handheld food storage containers for generating alerts for metal objects detected in such containers.

BACKGROUND

Halloween buckets are used by children when trick-or-treating. On Halloween, children travel from door to door asking for treats and residents hand out treats by tossing the treats into the bags or buckets carried by the children.

Unfortunately, some residents and other people may tamper with treats in an attempt to cause injury to others. For example, a razor blade may be inserted into the wrapper of a chocolate bar. As a result, a child may sustain injuries, such as a sliced finger. Children typically visit numerous homes, making it challenging to identify the culprits.

It would be advantageous to provide for enhanced safety of children and to identify the people committing these offences.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
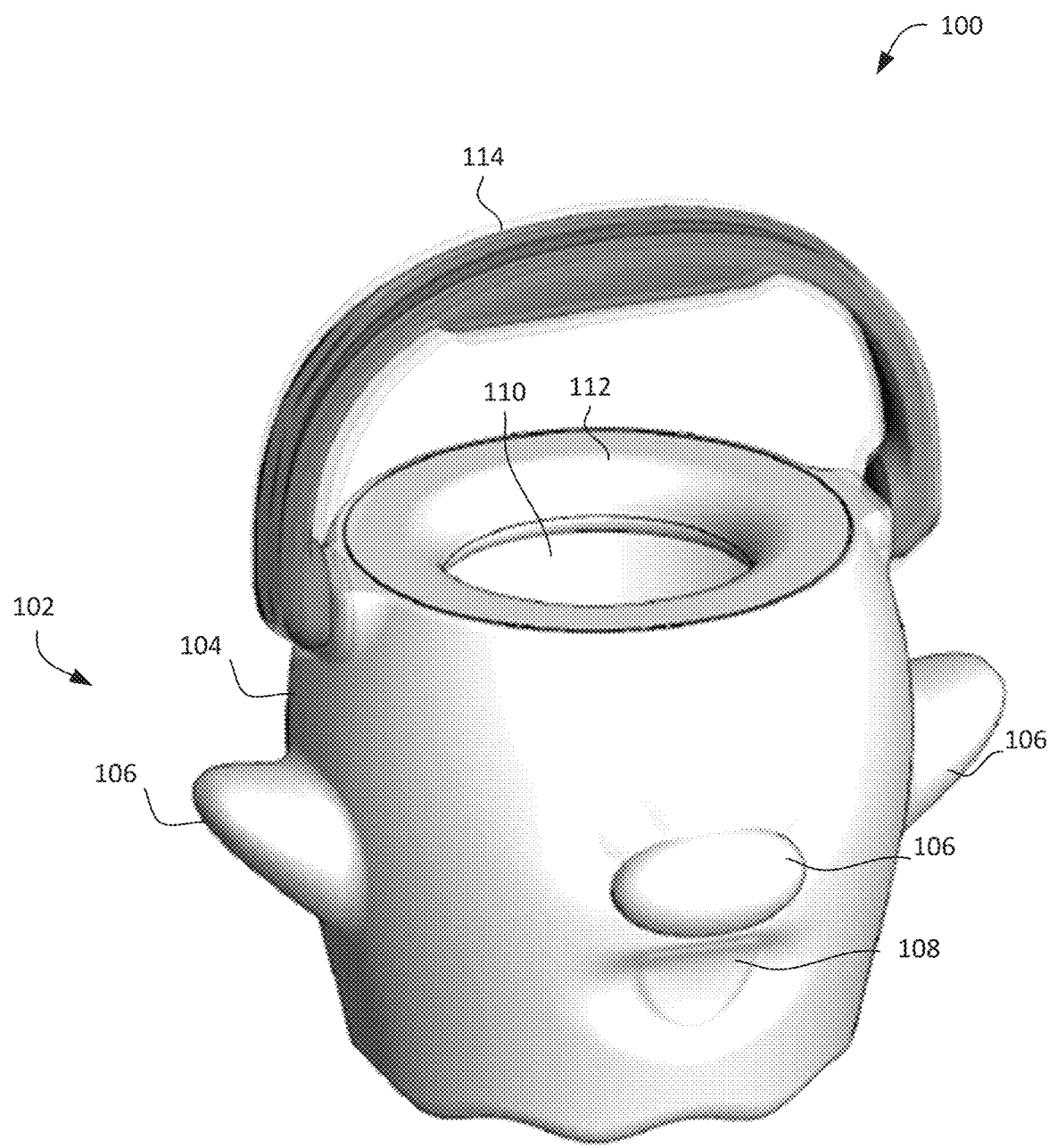
FIG. 1 shows a side perspective view of an example handheld food storage container.

In a first aspect, the present application describes a handheld food storage container. The container may include a body having a food storage area and an opening for receiving food items into the food storage area, a handle mounted to the body, a primary alert device housed in the handle, a secondary alert device housed in the body, and a metal detector for detecting metal objects located in the food storage area and for causing the actuation of the primary alert device and the secondary alert device.

In some implementations, the body may further include a removeable receptacle defining the food storage area.

In some implementations, the body may further include a collar surrounding the opening for narrowing the opening.

In some implementations, the primary alert device is a haptic alert device disposed in the handle.

In some implementations, the haptic alert device is a vibration motor operable to impart a vibration to the handle.

In some implementations, the secondary alert device is a visual alert device operable to produce a visual alert.

In some implementations, the visual alert is non-visible from the viewpoint of a person looking at the opening.

In some implementations, the visual alert is non-visible from the viewpoint of a person looking at a portion of the food storage area and wherein the portion is distal from the opening.

In some implementations, the body may further include a skirt for blocking at least a portion of the visual alert.

In some implementations, the visual alert device is a lamp.

In some implementations, the visual alert device is operable to emit light at a floor of the body.

In some implementations, the visual alert device is operable to illuminate at least an exterior portion of the floor.

In another aspect, the present application describes a method of providing an alert for a handheld food storage container. The method may include receiving a metal object through an opening in the handheld food storage container, detecting the metal object in a food storage area of the handheld food storage container, and in response to detecting the metal object: providing a primary alert for a first duration and providing a secondary alert for a second duration that is longer than the first duration.

In some implementations, generating the primary alert may include providing a haptic alert at a handle of the container.

In some implementations, generating the secondary alert may include providing a visual alert at a floor of the container.

In some implementations, the first duration is a defined period of time.

In some implementations, the method may further include terminating the secondary alert in response to a manual action taken.

In some implementations, the manual action taken may include the manual operation of a toggle device.

In some implementations, the toggle device is a power switch.

In another aspect, there may be a handheld food storage container configured to execute or perform any of the methods described herein.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In one aspect, the present application provides for a handheld food storage container that generates a discreet alert when a metal object is placed in the container. The alert may be discreet so that the person placing the metal object in the container is unaware that the metal object has been detected.

Reference is now made to FIG. 1, which shows a side perspective view of an example handheld food storage container. The container 100 has a body 102 for storing food items. Examples of food items include candies, chocolate bars, and other treats typically handed out to children on Halloween. The container 100 is of a size that is suitable for a child to carry.

The body 102 in this example has an exterior wall 104 that is in the shape of a ghost. It will be appreciated that the exterior wall 104 can have one of any number of suitable shapes, including a substantially spherical, cylindrical, frustoconical or jack-o'-lantern shape.

The surface of the exterior wall 104 in this example also includes various decorative protrusions 106 and indentations 108 that form the face and ears of the ghost. In some embodiments, the contour of the exterior wall 104 is a smooth surface and does not form any images.

The body 102 in this example also houses a receptacle 110. The receptacle 110 defines an interior space for storing food items, sometimes referred to as a food storage area or compartment. The upper portion of the body 102 includes a collar 112 for directing food items into the food storage area.

The container 100 also includes a handle 114 for carrying and handling the container 100. The handle 114 is pivotably attached to the body 102 and may be moved to a downward position when, for example, accessing a food item located in the food storage area or emptying the contents of the food storage area. The handle 114 may be placed in any of a number of positions, including a downward position or an upward position, also referred to as a carrying position, when placing a food item into the food storage area or retrieving a food item from the food storage area. The handle 114 may be contoured so that it conforms to the exterior wall 104 when in the downward position and so that access is provided to the food items in the food storage area when in the upward position.

Figure 2:
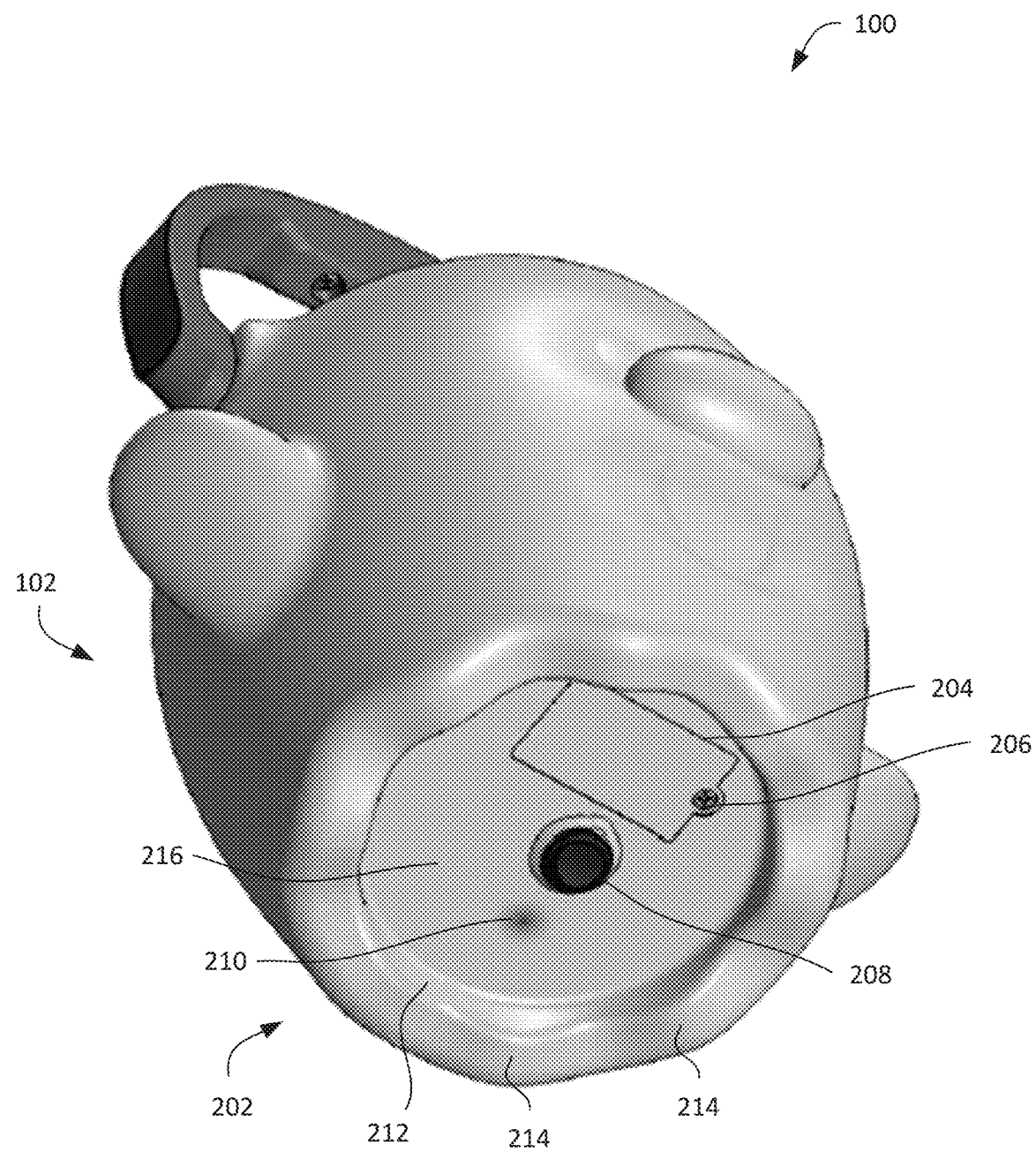
FIG. 2 shows a bottom perspective view of the handheld food storage container of FIG. 1.

Reference is now made to FIG. 2, which shows a bottom perspective view of the example container of FIG. 1. The base 202 of the container 102 includes a floor 216. In the illustrated example, the floor 216 has a substantially flat surface. In some embodiments, the floor may be a curved surface or another shape. A removeable a battery cover 204 disposed in the floor 216 provides access to a battery (not shown in FIG. 2). The battery cover 204 may prevent the battery from falling out of the container 102. The battery cover 204 may be secured to the floor 216 using a child proof fastener in order to prevent a child from easily removing the battery or inadvertently tampering with the battery. In this example, a screw 206 serves as a child proof fastener for the battery cover 204.

The floor 216 also includes a power switch 208 that controls the flow of electric power from the battery to the electronic components of the container 100. The power switch 208 may be used to turn the electronic components of the container on and off and allows for the conservation of battery power when the container is not in use. The power switch 208 is an on-off switch that has two states, namely an on state and an off state. In the on state, the power switch 208 facilitates the flow of power from the battery to the electronic components of the container 100. In the off state, the power switch 208 creates an open circuit. In this example, the power switch 208 is a pushbutton switch moveable between an on position in the on state and an off position in the off state.

The electrical components of the container 100 include a lamp (not shown in FIG. 2) that is positioned in the interior of the body 102 and adjacent the floor 216. In some embodiments, the lamp is fully enclosed within the body 102. While the lamp may be concealed from view and hidden in the body 102, the output of the lamp may be visible from the exterior of the body 102. For example, the lamp may produce and emit a light that causes a glow 210 in the floor 216, or at a portion of the floor 216 that is visible from the exterior of the body 102. In other words, the lamp may cause the floor 216, or a portion thereof, to glow. In some embodiments, the body 102 may be made from a material that allows for the floor 216 to glow, such as, for example, a translucent or semitransparent material, including a translucent plastic. In some embodiments, the lamp is visible when viewing the exterior surface of the floor 216 and may emit light that is directly visible when viewing the floor 216.

In the example container 100, the base 202 includes a skirt 212 for providing a physical barrier to block the glow 210 produced by the lamp. In some embodiments, the skirt 212 blocks at least a portion of the output of a visual alert device. In some embodiments, the skirt 212 extends in a direction away from the upper portion of the body 102. In some embodiments, the skirt 212 extends from the exterior wall 104 and/or the floor 216. In some embodiments, the skirt 212 is substantially perpendicular to the floor 216.

The skirt 212 includes a plurality of supports 214. The container 102 may rest on the supports 214 when placed on the ground, a table, or another surface.

Figure 3:
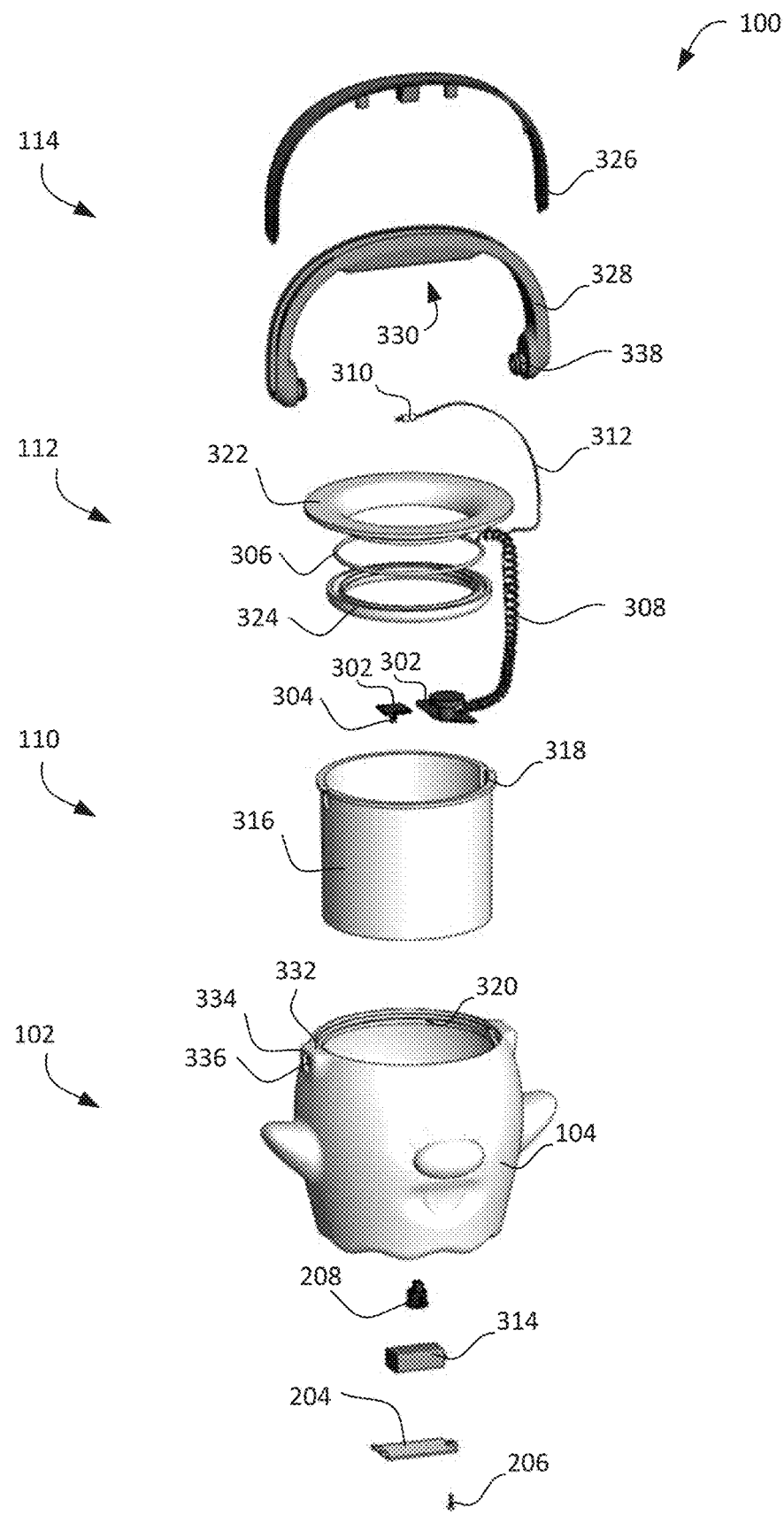
FIG. 3 shows an exploded side view of the example handheld food storage container of FIG. 1.

Reference is now made to FIG. 3, which shows an exploded view of the example food storage container of FIG. 1. The body 102 includes a metal detector for detecting metal and may also include an alert system for controlling alert devices. The metal detector and the alert system may be implemented, at least in part, as an integrated circuit or any other devices that may be configured to receive, process, or output electrical signals. The integrated circuit or other electric devices may reside on one or more printed circuit boards (PCBs) 302. Examples of electronic components that may reside on the PCBs 302 include a microcontroller, processor, oscillator, phase detector, amplifier, limiter and lamp 304. The metal detector may further include a coil 306 and coil wires 308. The alert system may further include the lamp 304, a vibration motor 310 and vibration motor wires 312. The metal detector and alert system may share one or more components and interact with one another.

It will be appreciated that aspects of the metal detector and alert system may be implemented way of software. Software includes processor-executable instructions that, when executed by one or more processors, may cause the processors to carry out some of the operations described in the present application. For example, a suitably programmed processor may implement, by way of software instructions, digital signal processing for the processing of an electrical signal from the coil 306 and transmitting an electrical signal to an alert device for actuating the device. The software instructions may be stored in a memory storage component (not shown). The memory storage may be a flash memory or other suitable memory storage device known in art.

Any suitable metal detector known in the art may be used. The metal detector may include a transmit coil for transmitting a magnetic field and a receive coil for detecting a magnetic field. An electrical signal is transmitted to the transmit coil which produces a magnetic field referred to as a transmitted magnetic field. The transmitted magnetic field may cause eddy currents to flow in metal objects that are in range of the transmitted magnetic field. The eddy currents generate a magnetic field that is detected by the receive coil. The receive coil generates an electrical signal that may be amplified and processed by electronic components of the metal detector. The received electrical signal may be analyzed. In some embodiments, the transmitted and received signals are compared with each other to determine whether a metal object has been detected.

The receive coil and transmit coil may be separate coils or the same coil. It will be appreciated that in some implementations more than one coil may be used. In the illustrated example, the metal detector includes a single coil 306.

In one embodiment, a pulse induction (PI) metal detector may be used. A voltage may be applied to the transmit coil and then abruptly turned off. After turning off the transmitted magnetic field, the metal detector measures and analyzes an electrical signal produced by a magnetic field from a metal object. In some embodiments, the metal detector may be a "very low frequency" (VLF) metal detector.

The metal detector may be configured to detect metal objects made from one or more metals, including ferrous metals, non-ferrous metals, iron, steel, stainless steel, nickel and/or cobalt. The metal detector may be configured to detect metal objects of various shapes and sizes that might be inserted and concealed in Halloween treats. For example, the metal detector may be configured to detect a metal object in the shape of a razorblade, thumbtack, sewing pin or other pin, or sewing needle or other needle. An example is a nickel-plated steel pin having a diameter of about 0.4 mm to 0.8 mm and a length of about 15 to 25 mm. Another example is a razorblade made of uncoated steel that is about 40 to 45 mm long, 20 to 25 mm wide and about 0.1 to 0.15 mm thick. It is further understood that the metal object may be a component of an object. For example, the metal object may be the metal shaft of a sewing pin that has a plastic head.

The alert system may be electrically connected to the metal detector. In some embodiments, the alert system may receive an electrical signal from the metal detector indicating detection of a metal object and may transmit one or more electrical signals to actuate the alert devices.

The alert devices may be one or more haptic, visual or audio alert devices. An example audio alert device is an electroacoustic transducer (not shown) configured to output one or more beeps or other sound pattern. An example haptic alert device is a vibration motor 310. An example visual alert device is a lamp 304 that produces visible light using, for example, one or more light emitting diodes (LEDs). In some embodiments, the visual alert device may be operable to emit light at the base 202, the floor 216 and/or the exterior surface of the floor 216. In some embodiments, the output of the visual alert may illuminate at least an exterior portion of the floor 216 and be visible from the viewpoint of a person looking at the exterior surface of the floor 216.

The container 100 includes a battery 314 that is an electric power source for supplying power to the metal detector and alert system. Any suitable portable electric power supply known in the art may be used. In some embodiments, the power supply is a direct current (DC) power supply, such as, for example, a nine volt DC battery. The example battery 314 is electrically connected to the PCBs 302.

The body 102 may also include a false bottom (not shown) for concealing and enclosing certain electronic components of the container 100. The false bottom may be parallel to the floor 216 of FIG. 2. Examples of electronic components housed between the false bottom and the floor 216 may include the battery 314, wires, the PCBs 302, the power switch 208, and the lamp 304.

Power is delivered to a coil 306 and a vibration motor 310 via coil wires 308 and vibration motor wires 312, respectively. The receptacle 110 may facilitate concealing the wires 312 and 308 from view. The receptacle 110 includes a receptacle wall 316 that has a cylindrical shape. In the illustrated example, the exterior wall 104 and receptacle wall 316 define a space in which electronic components, such as, for example, the vibration motor wires 312 and coil wires 308, may be disposed and concealed.

The receptacle 110 may be disposed adjacent the false bottom. The receptacle 110 may have an open end for receiving food items and a closed end (not shown) that abuts the false bottom. In some embodiments, the closed end and the receptacle wall 316 may define the food storage area. In some embodiments, both ends of the receptacle are open, in which case the food storage area may be defined by the receptacle wall 316 and the false bottom. In some embodiments, the receptacle 110 may not be included in the container 100, in which case the food storage area may be defined by the exterior wall 104 and the false bottom.

The receptacle wall 316 may extend from the false bottom to the upper portion of the exterior wall 104. The receptacle wall 316 includes a flange 318 that sits on a ledge 320 of the exterior wall 104. In this example, the ledge 320 is disposed proximate the rim of the exterior wall 104 and on the interior surface of the exterior wall 104. A collar 112 may prevent the receptacle 110 from falling out of the body 102. The some embodiments, the receptacle 110 is removeable secured to the body 102 by the collar 112. When the collar 112 is moved out of the way, the receptacle 110 and any food items stored therein may be removeable from the body 102.

The upper portion of the body of the container 100 includes the collar 112 that defines an opening through which food items pass into and out of the food storage area. The collar 112 may serve to narrow the opening. In particular, the collar 112 may allow for the diameter of the opening to be significantly smaller than the diameter of the receptacle 110 and the food storage area. For example, the diameter of the open end of the receptacle 110 may be greater than 16 cm, whereas the diameter of the opening of the collar 112 may be restricted or reduced to less than 12 cm in diameter.

In some embodiments, the metal detector may be falsely triggered by hand jewelry worn by a person placing a food item into the food storage area. An example of hand jewelry is a wedding ring. The collar 112 may provide a barrier that may deter or discourage people from placing their hand into the body 102, as people may be less comfortable to put their hand in a smaller opening as opposed to a larger opening and further because a small opening may visually appear to be difficult to put a hand into. Accordingly, the collar 112 may reduce the likelihood of hand jewelry triggering false alarms.

In the example illustration, the collar 112 houses a coil 306 for detecting metal objects in the food storage area. The collar 112 may include an upper collar portion 322 and a lower collar portion 324 for mounting and concealing the coil 306 therebetween. The coil 306 may be circular-shaped and the diameter of the coil 306 may be substantially the same or slightly larger than the diameter of the collar 112 opening.

In some embodiments, decreasing the diameter of the coil 306 allows the metal detector to detect smaller objects, as a metal detector may be more sensitive to metal objects that are closer to the coil 306 than to those that are further away. Furthermore, the detection range of some metal detectors has a toroidal shape that surrounds the coil 306, where metal objects passing through the center of the toroid are not detected. Reducing the diameter of the coil 306 may close the center hole in the detection range so that the detection range has a disc shape instead of a toroidal shape. Reducing the diameter of the coil 306 may reduce the range of the metal detector and false triggers caused by hand jewelry. Accordingly, placing the coil 306 in the collar 112 may allow for the diameter of the coil 306 to be reduced and for the functionality of the metal detector to be improved.

It will be appreciated that the coil 306 may be disposed proximate to the opening of the body 102 to the food storage area or may be disposed lower in the body 102, including proximate to any one of a bottom end of the food storage area, closed end of the receptacle 110, false bottom or floor 216. Positioning the coil 306 at the opening may allow for the detection of metal objects as they enter the food storage area and further allow for the metal detector to detect metal objects without the need to penetrate through a stack of food items when the food storage area of the container 100 is full. It will be appreciated that the metal detector should be configured so that metal objects that enter the container 100 may be detected even when the container 100 is substantially full.

In some embodiments, positioning the coil 306 away from the opening may reduce the likelihood of false alarms caused by hand jewelry. In some embodiments, the coil 306 may be positioned in the upper half of the food storage area and/or receptacle 110 and distal from the opening of the body 102 and the collar 112. In some embodiments, the coil 306 may be disposed between the receptacle 110 and the exterior wall 104.

The collar 112 may be disposed in and extend into an interior space defined by the exterior wall 104 and/or the receptacle 110. In some embodiments, the collar 112 is an annular ring. In the illustrated example, the collar 112 is shaped as a funnel that narrows gradually.

In some embodiments, the collar 112 may be permanently attached to the body 102. For example, the upper rim of the collar 112 may engage, and snap fit into, a groove located in the inner surface of the exterior wall 104 proximate the rim of the upper portion of the exterior wall 104. In this example, the receptacle 110 may not be removeable from the body 102.

In some embodiments, the collar 112 may be removeably secured to the body 102. For example, the collar 112 may be clipped to the exterior wall 104. The clips (not shown) may be released to remove the collar 122. The coil wires 308 may also be disconnected or unplugged from the coil 306. In some embodiments, the collar 112 may be hingedly attached to the upper portion of the exterior wall 104 of the body 102. When the collar 112 is swung to an open position, the receptacle 110 may be removed from the body 102. Removing the collar 112, or moving the collar 112 to an open position, may provide for easier access to the food items stored in the receptacle 110 and, in some embodiments, may allow for removing the receptacle 110 from the body 102.

The container 100 includes a handle 114 that houses the vibration motor 310. The vibration motor 310 is operable to impart a vibration in the handle 114 and may produce a strong enough vibration to alert a person holding the handle 114 of an event. The vibration motor 310 may generate unwanted noise during operation. Any sound that is produced by the operation of the vibration motor 310 may be substantially reduced or muffled using known techniques. For example, the handle 114 may include sound barriers or noise dampening elements (not shown) that reduce or muffle the noise of the vibration motor 310.

To accommodate the vibration motor 310, and the corresponding vibration motor wires 312, the example handle 114 employs a hollow handle construction. The hollow handle construction also minimizes the weight of the container. The hollow handle construction, as illustrated, is a two-piece construction including an upper handle portion 326 and a lower handle portion 328. The two portions may be attached to each other any number of ways, including through the use of fasteners or a snap fit. The lower handle portion 328 includes a grip portion 330 generally located in the center of the handle. The grip portion 330 may be of a thickness that is appropriate for being gripped by one and/or two hands of a child and/or adult.

The upper handle portion 326 and a lower handle portion 328 define a hollow space therebetween. The hollow space is partially defined by a groove in the lower handle portion 328 that extends lengthwise along the lower handle portion 328. The hollow space includes a chamber in the grip portion 330 for housing the vibration motor 310 in the handle 114 and also includes a passageway for the vibration motor wires 312 that electrically connect the vibration motor 310 to the PCBs 302.

The vibration motor 310 may have dimensions that are suitable for disposing the motor in the grip portion 330. In some embodiments, the vibration motor 310 is about six millimeters in diameter and about twelve millimeters in length.

The handle 114 is pivotably mounted to the body 102. The container 100 may be configured so that when the handle 114 pivots, the vibration motor 310 does not enter the detection range of the metal detector and cause a false alarm. In the example illustrated, two handle mounts 332 are positioned on the upper portion of the exterior wall 104. Each handle mount 332, as illustrated, extends from an exterior surface of the exterior wall 104. The handle mounts 332 are connected to opposite sides of the body 102 and are positioned adjacent the coil 306 so that the handle 114 pivots about the coil 306. As the handle 114 pivots between an upright position and a downward resting position, the vibration motor 310 maintains a minimum distance from the coil 306.

The handle 114 may be mounted in a manner that allows the vibration motor wires 312 to remain concealed. The handle mounts 332 provide support surfaces 334 that are parallel to each other. Each support surface 334 has a handle hole 336 for receiving a respective end of the handle 114. The handle 114 has two ends. Each end, as illustrated, includes a snap bushing 338 that snap fits into the handle holes 336. The snap bushing 338 is sometimes referred to as a snap grommet. Once installed, the ends of the handle 114 pivot about the same axis. In the example shown, the wires 312 may travel from the interior of the body 102 to the interior of the handle 114 via the handle holes 336.

It will be appreciated that the alerts generated by the container 100 may be discreet so that a person placing a metal object into the container 100 is not made aware of the detection of the metal object. Accordingly, the alert devices may be concealed in the container 100 and may be positioned such that the alert device and/or its output are not visible to a person placing objects into the container 100. In some embodiments, the alert device and/or its output are non-visible to a person placing an object into the container 100. In some embodiments, the alert device and/or its output are non-visible from the viewpoint of a person looking into the interior of the body 102 and/or looking at, towards and/or through an opening of the body 102 and/or looking at and/or towards the interior surface of the floor 216, the false bottom, the food storage area, the bottom of the food storage area, a portion of the food storage area where the portion is distal from the opening, and/or a closed end of the receptacle 110. In some embodiments, the alert device and/or its output may be non-visible when the container 100 is positioned on flat surface, such as a table, and is in an upright position and/or supported by the base 202 and/or supports 214. In some embodiments, the alert device and/or its output are non-visible from the viewpoint of a person looking at an opening of the container 100 along a longitudinal axis defined by the container 100 and extending through the opening. In some embodiments, the alert device and/or its output are non-visible from the exterior of the container 100. In some embodiments, the alert device and/or its output are non-visible from the exterior of the container 100 when the container 100 is upright in a normal carry position and is viewed from above a plane that is parallel to the ground and that intersects the container 100, or a portion thereof. The portion of the container 100 may include, for example, an opening or other component.

In some embodiments, the container 100 may also include a wireless transmitter and receiver (not shown) for transmitting an alert notification to a receiving device, such as, for example, a mobile computing device, including a smartphone. The alert notification may indicate the detection of a metal object in the container 100. The transmission may be performed in accordance with any known wireless communication techniques known in the art. In some embodiments, the communication may be implemented using Bluetooth or Wi-Fi wireless technologies. The receiving device may be in proximity to the container 100 or it may be away from the container 100.

Figure 4:
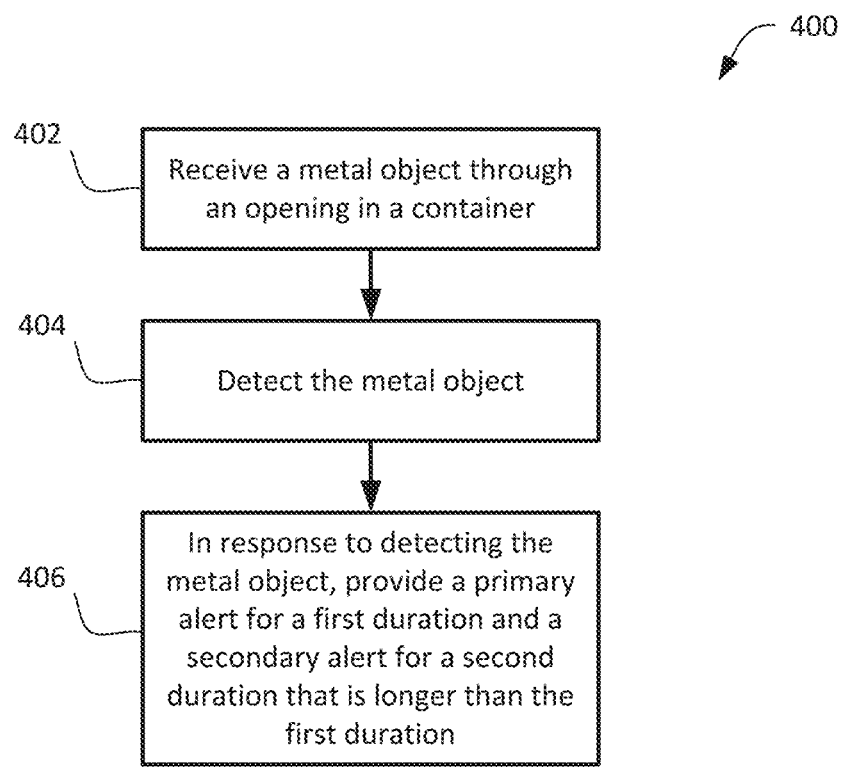
FIG. 4 shows a flowchart of an example method of generating an alert for a handheld food storage container.

Reference is now made to FIG. 4, which shows a flowchart of an example method 400 of generating an alert when a metal object is received in a handheld food storage container. In this example method 400, the described operations are carried out by the example container 100 of FIG. 1. The described operations may be carried out, for example, in the context of a child using the container while trick-or-treating. The method 400 may be triggered by a person handing out and placing tampered Halloween candy into the container.

In operation 402, a metal object is received through an opening in a container. In operation 404, when a metal object enters the detection range of a metal detector housed in the container, the metal detector generates a signal indicating the detection of metal in the container.

In the method 400, the metal detector triggers a two-stage alert. In the first stage, a primary alert may be provided to warn a person carrying the container, such as a child, that metal has been detected. However, in the excitement of Halloween, the carrier of the container may be unsure of whether the primary alert occurred, or may not fully appreciate or grasp the primary alert, or may not notify an adult of the primary alert. Accordingly, in a second stage, a secondary alert may be provided to allow for confirmation of the primary alert and/or to warn a person not carrying the container at the time of detection, such as a parent or other person accompanying the child, of the detection. The two-stage alert may allow for an immediate alert to be observed when a metal detection event occurs and may also allow for a corresponding alert to be observed at a later point in time, such as a few minutes after the immediate alert has been observed or when a trick-or-treater arrives home with their container full of treats.

In at least some embodiments, the alerts may be discreet so that a child carrying the container while trick-or-treating is not put into harm's way. In this case, while the alerts may warn a person carrying the container of the detection, the alerts should not warn or draw the attention of the person who is handing out and placing dangerous metal laced treats into the container. Accordingly, the alerts may be subtle or hidden, yet still allow for a child and/or parent to be aware of the alert.

An alert may be a haptic, visual or audio alert generated by actuating one or more haptic, visual or audio alert devices. In some embodiments, non-audio alerts may provide for a greater degree of discretion than audio alerts. In order to maintain discretion, the container may be configured such that a haptic and/or a visual device is inaudible, barely audible, or substantially inaudible when actuated.

An example haptic alert is the vibration of a handle or other part of the container that a human may be in contact with when a food item is placed into the container. The vibration may be induced, for example, by actuating a vibration motor.

An example visual alert is the illumination of a warning light or a similar indicator. The visible light may be produced and emitted, for example, by actuating and illuminating a lamp.

In operation 406, in response to detecting the metal object, the container generates two alerts indicating that a metal object has been detected. Each alert may be continuous or intermittent, such as a series of pulses or other output pattern. The duration of the alerts may be the same or different. The primary alert may be provided for a first duration and the secondary alert may be provided for a second duration. In some embodiments, the second duration is longer than the first duration.

In some embodiments, an alert may be output for a defined period of time. The defined period of time may be a fixed number of seconds, such as, for example, between two to five seconds. The defined period of time may be at least the minimum time required for a person to sense the alert.

In some embodiments, the container may provide the primary alert and/or secondary alert until an action is taken. In other words, an alert may be terminated in response to action taken. In some embodiments, the action taken may be a manual action. The manual action may involve directly interacting with a component of the container. An example action is the manual operation of a toggle device, such as, for example, a power switch or a reset button, which may involve, for example, flipping a switch to turn off the power to the container or pressing a reset button to reset one or more alerts. Another example action is the manual removal of a detected metal object from the food storage area. In this example, the alert may be provided for the period of time during which the metal detector detects a metal object.

In some embodiments, the primary alert is referred to as a temporary alert and the secondary alert is referred to as a permanent alert. A permanent alert may be an alert that terminates when the container is turned off and/or the alert system is reset, whereas a temporary alert may be an alert that is provided at the initial detection and/or terminates before the container is turned off and/or the alert system is reset.

Referring to the example container FIG. 3, the primary alert may be a vibration and the secondary alert may be an illumination of the lamp. When a metal object is detected, the metal detector may cause both the vibration motor and lamp to be actuated. The vibration motor may be automatically deactuated after a few seconds and the lamp may be deactuated in response to the toggling of the power switch.

It will be appreciated that it may be that some or all of the above-described operations of the various above-described example methods may be performed in orders other than those illustrated and/or may be performed concurrently and/or sequentially without varying the overall operation of those methods.

Various components of the container, including the body and handle, may be made of plastic or any other suitable material that will not be detected by the metal detector. The handle and/or the grip portion of the handle may also be made of a material that is capable of easily transmitting vibrations from the vibration motor to a human hand.

Various electrical components, such as PCBs and batteries, may be disposed in any suitable location in the container away from the coil, including in the handle or between the floor and the false bottom, in order to prevent their detection by the metal detector.

Example embodiments of the present application are not limited to any particular system architecture.

It will be understood that the components implementing the container may be attached or secured to each other using standard techniques. The present application is not limited to particular fasteners, snap fittings, bushing, grommets, connectors, hinges, glues, or other such implementation details.

Those skilled in the art will recognize that the described components may be implemented as separate components. In some implementations, the one or more components are formed of a unitary piece of material. For example, the exterior wall, handle mounts, and base, supports and floor may be formed of a unitary plastic material. As another example, the receptacle wall and the false bottom may be constructed as a single piece. As yet another example, the collar and the receptacle wall may be a single piece.

Certain adaptations and modifications of the described embodiments can be made. Therefore, the above discussed embodiments are considered to be illustrative and not restrictive.

What is claimed is:

1. A handheld food storage container, the handheld food storage container comprising:
   a body having a food storage area and an opening for receiving food items into the food storage area;
   a handle mounted to the body;
   a primary alert device housed in the handle;
   a secondary alert device housed in the body that is operable to illuminate at least an exterior portion of a floor of the container; and
   a metal detector for detecting metal objects located in the food storage area and for causing the actuation of the primary alert device and the secondary alert device.

2. The container of claim 1, the body further comprising:
   a removeable receptacle defining the food storage area.

3. The container of claim 1, the body further comprising:
   a collar surrounding the opening for narrowing the opening.

4. The container of claim 1, wherein the primary alert device is a haptic alert device disposed in the handle.

5. The container of claim 4, wherein the haptic alert device is a vibration motor operable to impart a vibration to the handle.

6. The container of claim 1, wherein secondary alert device is a visual alert device operable to produce a visual alert.

7. The container of claim 6, wherein the visual alert is non-visible from the viewpoint of a person looking at the opening.

8. The container of claim 6, wherein the visual alert is non-visible from the viewpoint of a person looking at a portion of the food storage area and wherein the portion is distal from the opening.

9. The container of claim 6, the body further comprising:
   a skirt for blocking at least a portion of the visual alert.

10. The container of claim 6, wherein the visual alert device is a lamp.

11. A method of providing an alert for a handheld food storage container, the method comprising:
    receiving a metal object through an opening in the handheld food storage container;
    detecting the metal object in a food storage area of the handheld food storage container; and
    in response to detecting the metal object:
       providing a primary alert at a handle of the container for a first duration; and
       providing a secondary alert for a second duration that is longer than the first duration, wherein the secondary alert illuminates at least an exterior portion of a floor of the container.

12. The method of claim 11, wherein the primary alert comprises a haptic alert.

13. The method of claim 11, wherein the first duration is a defined period of time.

14. The method of claim 13, further comprising:
    terminating the secondary alert in response to a manual action taken.

15. The method of claim 14, wherein the manual action taken comprises the manual operation of a toggle device.

16. The method of claim 15, wherein the toggle device is a power switch.

17. A handheld food storage container, the container configured to execute the method of claim 11.

* * * * *